United States Patent
Levy et al.

(10) Patent No.: US 11,575,711 B2
(45) Date of Patent: Feb. 7, 2023

(54) DEVICE MANAGEMENT SYSTEM

(71) Applicant: Family Zone Cyber Safety Ltd, Perth (AU)

(72) Inventors: Timothy David Levy, Subiaco (AU); Benjamin Shaun Dixon Trigger, Belmont (AU); Crispin Swan, Freshwater (AU); Paul Robinson, Reston, VA (US)

(73) Assignee: Family Zone Cyber Safety Ltd, Perth (AU)

( * ) Notice: Subject to any disclaimer, the term of this patent is extended or adjusted under 35 U.S.C. 154(b) by 160 days.

(21) Appl. No.: 16/854,000

(22) Filed: Apr. 21, 2020

(65) Prior Publication Data
US 2020/0252433 A1     Aug. 6, 2020

Related U.S. Application Data

(63) Continuation of application No. PCT/AU2018/051160, filed on Oct. 29, 2018.

(30) Foreign Application Priority Data

Oct. 31, 2017   (AU) .................... 2017904428

(51) Int. Cl.
*H04L 9/40*      (2022.01)
(52) U.S. Cl.
CPC .......... *H04L 63/20* (2013.01); *H04L 63/0876* (2013.01); *H04L 63/102* (2013.01); *H04L 63/108* (2013.01)
(58) Field of Classification Search
CPC ... H04L 63/20; H04L 63/0876; H04L 63/102; H04L 63/108; H04L 63/0263;
(Continued)

(56) References Cited

U.S. PATENT DOCUMENTS

2002/0016840 A1* 2/2002 Herzog ................ H04L 41/044
                                                                 709/225
2007/0109983 A1    5/2007 Shankar et al.
(Continued)

FOREIGN PATENT DOCUMENTS

| WO | 2006093917 A2 | 9/2006 |
| WO | 2013124602 A1 | 8/2013 |
| WO | 2014009777 A1 | 1/2014 |

OTHER PUBLICATIONS

Extended European Search Report dated Oct. 8, 2020 in EP Patent Application No. 18874667.1. 9 pages.
(Continued)

*Primary Examiner* — Khoi V Le
(74) *Attorney, Agent, or Firm* — Kilpatrick Townsend & Stockton LLP

(57) ABSTRACT

A system manages usage of a network-enabled user device. A policy storage is separately located relative to the user device and stores usage policy sets. Each policy set comprises policies defining usage permissions/restrictions applicable to the user device. The system associates a first user with a first time period and a second user with a second time period, each time period exclusive of other time periods. The first user selects/modifies a first policy set for applying during the first time period, and the second user selects/modifies a second policy set for applying during the second time period. The first user cannot select/modify any policy set applicable during the second time period, and the second user cannot select/modify any policy set applicable during the first time period. A usage request from the user device is allowed/denied based on the policy set to be applied when the usage request is made.

16 Claims, 6 Drawing Sheets

(58) Field of Classification Search
CPC . H04L 63/0227; H04L 63/101; H04L 67/325;
H04L 67/025; H04L 41/0859; H04L
41/0893; H04L 41/5096; G06F
2221/2137; G06F 2221/2149; G06F
21/62; H04W 4/50
See application file for complete search history.

(56) References Cited

U.S. PATENT DOCUMENTS

| | | | |
|---|---|---|---|
| 2008/0040773 A1 | 2/2008 | AlBadarin et al. | |
| 2009/0007229 A1* | 1/2009 | Stokes | G06F 21/6218 726/2 |
| 2010/0017889 A1 | 1/2010 | Newstadt et al. | |
| 2010/0188992 A1 | 7/2010 | Raleigh | |
| 2012/0278881 A1* | 11/2012 | Mann | G06F 21/6281 726/17 |
| 2014/0026179 A1* | 1/2014 | Devarajan | H04L 63/0227 726/1 |
| 2014/0195681 A1* | 7/2014 | Chan | H04L 41/0809 709/225 |
| 2016/0006604 A1* | 1/2016 | Freimark | H04W 4/50 455/419 |
| 2017/0026382 A1* | 1/2017 | Trigger | H04W 12/08 |
| 2017/0041454 A1 | 2/2017 | Nicholls et al. | |
| 2017/0142068 A1* | 5/2017 | Devarajan | H04L 67/146 |

OTHER PUBLICATIONS

Office Action dated May 25, 2021 in CA Patent Application No. 2,944,923. 4 pages.
Extended European Search Report dated Nov. 29, 2021 in EP Patent Application No. 21173083.3. 12 pages.
International Search Report and Written Opinion dated Jan. 9, 2019 in International Patent Application No. PCT/AU2018/051160. 12 pages.
International Preliminary Report on Patentability dated Oct. 9, 2019 in International Patent Application No. PCT/AU2018/051160. 8 pages.
International-Type Search Report dated Aug. 14, 2018 in AU Patent Application 2017904428. 15 pages.

* cited by examiner

DEVICE MANAGEMENT SYSTEM

CROSS-REFERENCES TO RELATED APPLICATIONS

This application is a continuation application of International Patent Application No. PCT/AU2018/051160 entitled "A DEVICE MANAGEMENT SYSTEM," filed on Oct. 29, 2018, which claims priority to Australian Patent Application No. 2017904428, filed on Oct. 31, 2017, all of which are herein incorporated by reference in their entirety for all purposes.

TECHNICAL FIELD

The present invention relates to a device management system for managing usage of at least one network enabled device, such as a smart phone, tablet computer and personal computer, and a related method for managing usage of such devices.

BACKGROUND OF THE INVENTION

The proliferation of network enabled devices including smart phones, tablet computers and personal computing devices has revolutionised the way people communicate, shop, and consume media and entertainment. Whilst such devices provide many benefits to users, they also present challenges in that users are able to access material that may be considered inappropriate for them. In addition, users are able to use applications and features of the devices with little or no restriction and this may be undesirable, particularly for children.

It is known to restrict the availability of material on a network enabled device using "Internet filtering" techniques. Such Internet filtering techniques can be applied at a network level such that an Internet service provider or administrator of a local network incorporates a network filter applicable to all devices that access the network. Internet filtering may also take the form of a client filter that is applied at a device level through installation of software on the device.

Some device users, such as children, may come under the care of different guardians at different times. Different guardians may wish to allow different levels of usage of the devices during respective time periods.

BRIEF SUMMARY OF THE INVENTION

According to a first aspect of the invention, there is provided a system for managing usage of a network enabled user device, the system comprising:

a policy storage separately located relative to the user device, the policy storage arranged to store information indicative of a plurality of usage policy sets applicable to the user device, each policy set comprising a plurality of usage policies defining usage permissions and/or usage restrictions applicable to the user device;

the system arranged to associate a first authorised user with at least one first time period, and to associate a second authorised user with at least one second time period different to the at least one first time period, wherein each time period is exclusive of any other time period;

the system arranged to allow the first authorised user to select and/or modify a first policy set to be applied to the user device during the at least one first time period, and to allow the second authorised user to select and/or modify a second policy set to be applied to the user device during the at least one second time period, the system arranged such that the first authorised user cannot select and/or modify any policy set applicable during the at least one second time period and the second authorised user cannot select and/or modify any policy set applicable during the at least one first time period; and the system arranged to allow or deny a usage request from the user device based on the usage policy set to be applied when the usage request is made.

The system may be arranged to allow each authorised user to modify a respective policy set by modifying and/or defining at least one usage policy of the respective usage policy set.

Each time period may correspond to at least one day and/or a portion of a day.

The usage policies applicable to the user device may be dependent on a type of day according to a calendar year.

In an embodiment, the day type is a week day, a weekend day, a personal holiday day, a public holiday day, or a school day.

The system may be arranged to allow, for any particular day, the first authorised user to modify the day type to a different day type such that different usage policies are applicable to the user device.

The system may be arranged to allow the first authorised user to modify the at least one first time period.

The system may be arranged to allow the first authorised user to modify the at least one second time period.

The system may be arranged to allow the second authorised user to select and/or modify the second policy set if permission is granted by the first authorised user.

The system may be capable of managing usage of a plurality of network enabled user devices.

The system may be arranged to store user device identification information for each user device managed by the system, the user device identification information being indicative of and unique to a user device managed by the system and being stored separate relative to the user device.

The information indicative of and unique to at least one user device managed by the system may include a MAC address, a SIM card number, an IMEI number or a mobile telephone number of the user device.

According to a second aspect of the invention, there is provided a method of managing usage of a network enabled user device, the method comprising:

storing information indicative of a plurality of usage policy sets applicable to the user device, each policy set comprising a plurality of usage policies defining usage permissions and/or usage restrictions applicable to the user device;

associating a first authorised user with at least one first time period;

associating a second authorised user with at least one second time period different to the at least one first time period;

allowing a first authorised user to select and/or modify a first policy set to be applied to the user device during the at least one first time period;

allowing a second authorised user to select and/or modify a second policy set to be applied to the user device during the at least one second time period; and allow or deny a usage request from the user device based on the usage policy set to be applied when the usage request is made, wherein each time period is exclusive of any other time period and wherein the first authorised user cannot select and/or modify any policy set applicable during the at least one second time period and the second authorised user cannot select and/or modify any policy set applicable during the at least one first time period.

BRIEF DESCRIPTION OF THE DRAWINGS

The present invention will now be described, by way of example only, with reference to the accompanying drawings, in which.

DETAILED DESCRIPTION OF THE INVENTION

Overview of the System

Figure 1:
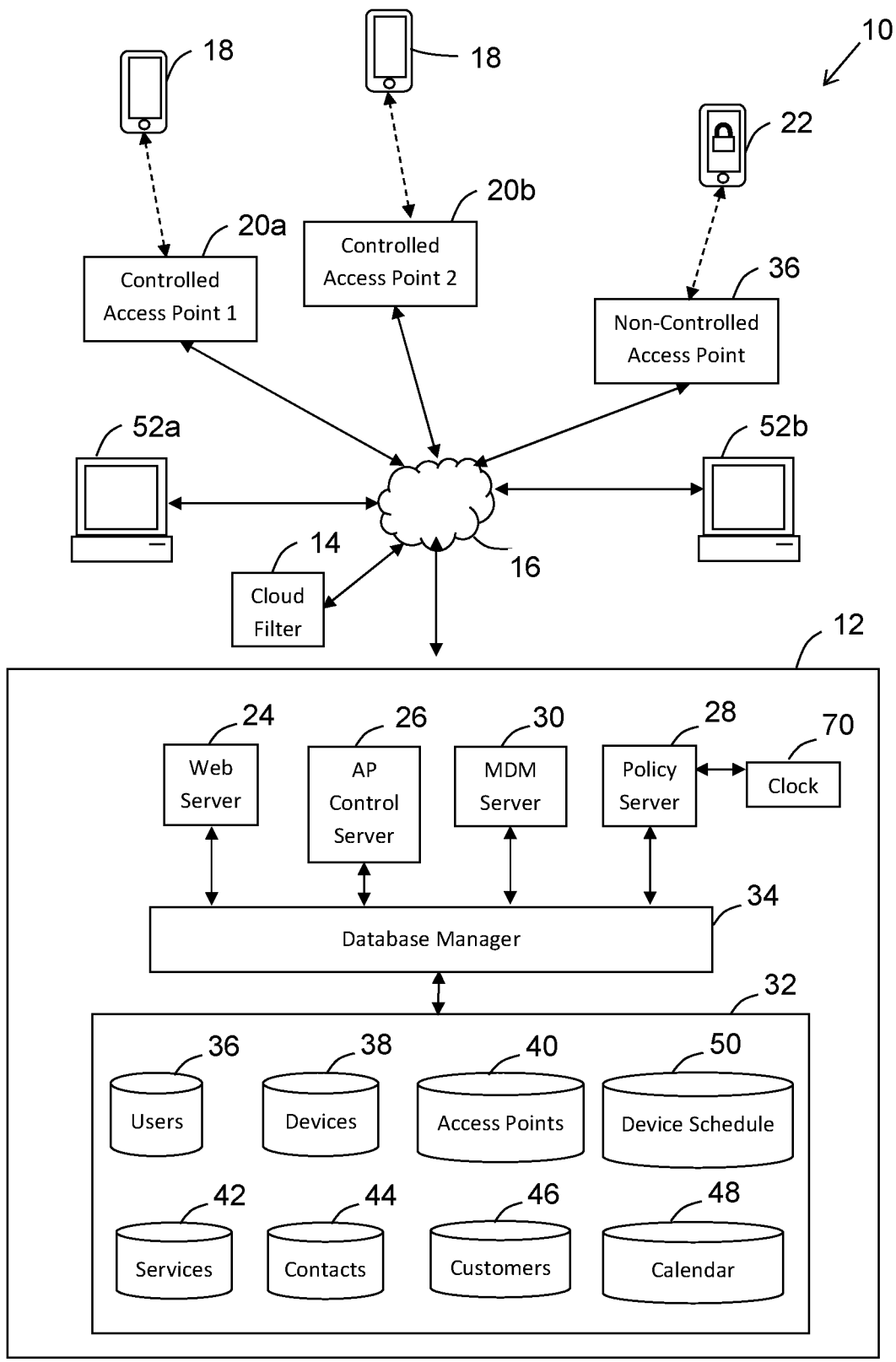
FIG. 1 is a block diagram of a device management system in accordance with an embodiment of the present invention.

Referring to FIG. 1 of the drawings, a device management system 10 for managing network access and device usage is shown. In the present example, the device management system 10 is configured to manage device access to the Internet, and to manage usage of device features such as a device camera, and manage usage and installation of applications on devices, such as usage of communications applications such as text, phone and email on the devices. However, it will be understood that any control and/or management of device usage is envisaged.

The system 10 is configured for use with non-controlled user devices 18, for example a smart phone, a tablet computer or a personal computing device, which do not have an installed usage control application. The non-controlled user devices 18 are provided with device usage control through a controlled access point 20 that interfaces with a device management platform 12 of the system 10, which will be described in more detail below. The system 10 in this example includes a plurality of controlled access points 20a and 20b at different physical locations, so that it is possible for a non-controlled user device 18 to be managed by the system 10 through different controlled access points.

The system 10 also operates with controlled user devices 22, for example a smart phone, a tablet computer or a personal computing device. The controlled user devices including client software that is managed by the device control platform 12 and arranged to provide device usage control including network access control and/or control of usage of applications and/or features on the controlled user devices 22.

Since each device that is associated with the system 10 either has a usage control application installed on the device, or accesses the wide area network 16 through for example a controlled access point 20, a degree of device usage control is always present for each device.

The device control platform 12 is arranged to manage and control operation of the system 10. The platform 12 effectively constitutes a back-end system located remotely from other components of the system 10. The platform 12 stores information indicative of access permissions in the form of usage policies for each device associated with the system. The platform 12 also manages dissemination and enforcement of the usage policies for all of the devices. The platform 12 stores the information in a manner that is indicative of usage policy sets, where each set comprises a plurality of usage policies defining usage permissions and/or restrictions applicable to a user device managed by the system 10.

The device management system 10 connects to a cloud filter 14 through a wide area network 16, which in this example includes the Internet. The cloud filter 14 stores access rules indicative of access rights for Internet sites. The cloud filter 14 also makes decisions on whether a usage request from a user device 18, 22 should be allowed or denied based on the relevant usage policy set applicable to the user device at the time the request was made. In this example the cloud filter 14 is managed by a third party.

The policy sets applicable to a user device are selected and/or modified by an authorised user or administrator, such as a parent or an education provider. In some situations it is desirable for different authorised users to have control over the policy sets applicable to the user device at different specified time periods. This may arise when a user of the device is under the care of different guardians at different times. For example, if the user is a child, it may be desirable for the child's school to have control over the policy sets applicable to the device during a school time period, and the child's parent(s) to have control over the policy sets applicable at any other time.

Accordingly, the system 10 is arranged to allow a first authorised user, such as a parent, to select and/or modify a first policy set to be applied to a user device managed by the system 10 during at least one first specified time period. The system 10 is also arranged to allow a second authorised user, such as a teacher, to select and/or modify a second policy set to be applied to the same user device during at least one second specified time period. The system 10 thus associates the first authorised user with the first specified or predefined time period(s), and the second authorised user with the second specified or predefined time period(s). For example, referring to FIG. 2, for the user device 18, the first authorised user may select policy sets applicable to 'Time Period 2', 'Time Period 3', 'Time Period 4' and 'Time Period 5', and the second authorised user may select policy sets applicable to 'Time Period 1'.

Figure 2:
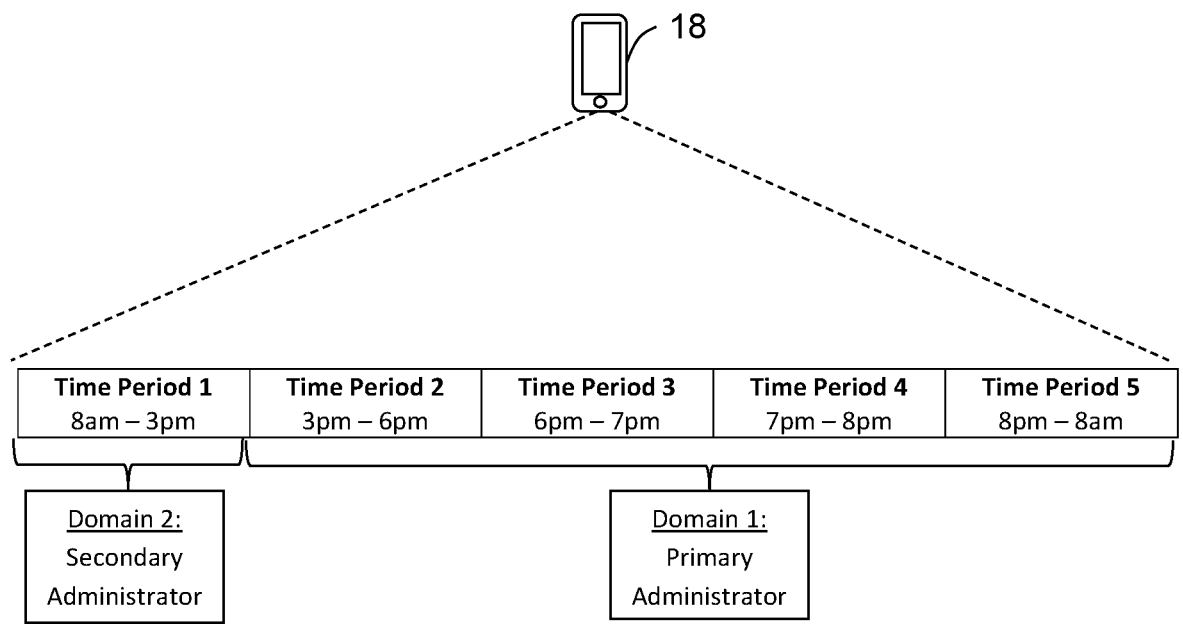
FIG. 2 is a schematic representation illustrating control of a device by the device management system.

As illustrated in FIG. 2, each time period is exclusive of any other time period. The system 10 is also arranged such that the first authorised user cannot select and/or modify any policy set applicable during the at least one second time period and the second authorised user cannot select and/or modify any policy set applicable during the at least one first time period. The system 10 thus restricts selection and modification of the policy sets applicable to each predefined time period to authorised users associated with those time periods. Nonetheless, it will be understood that there may be more than one authorised user associated with each first and second predefined time period.

Furthermore, either the first or second authorised user may have a greater degree of responsibility over the user of the device. Therefore the system 10 is also configured to recognise a "primary administrator" and a "secondary administrator" as the authorised users.

The device control platform 12 is accessible by users or administrators for the purpose of defining and/or modifying usage policies for devices with which the administrator is associated. Multiple administrator terminals 52a and 52b are shown in FIG. 1 to illustrate that the system 10 allows a plurality of different administrators to access the system 10, such as a primary and secondary administrator of the same user device. Those skilled in the art will also appreciate that a single administrator may also be authorised to select policy sets for a plurality of different devices.

When a usage request is made from the user device 18 or 22, the system 10 allows or denies the usage request based on which specified time period applies at the time the usage request was made, and the usage policy set applicable during that time period.

Overview of System Components

An overview of specific components of the system 10 will now be provided. The device control platform 12 in this example comprises the following components.

Web Server: A web server 24 is arranged to serve web pages to an administrator on request, such as an administrator using a terminal 52, in order to register devices and/or manage the respective levels of usage provided to devices associated with the system. Respective levels of device usage provided to users of devices can be managed by selecting predefined usage policy sets, and modifying the selected usage policies as appropriate, which will be described in more detail below.

Access Point Control Server: An access point control server 26 is arranged to manage setup and operation of controlled access points 20, including communication with the access points 20, for example, to manage configuration and firmware updates of the access point 20.

Policy Server: A policy server 28 stores usage policies selectable and customisable by authorised administrators. The policy server 28 also stores default usage policies that are selectable and customisable by an authorised administrator. The policy server 28 also stores the usage policies that have been selected and/or created by the administrator for devices under control of the administrator, and determines the appropriate access policy to apply to each user request.

Mobile Device Management (MDM) Server: A MDM server 30 manages the controlled user devices 22 so that the access control software installed on the controlled user devices is up-to-date. The MDM server 30 also monitors the controlled user devices 22 to ensure that the access control software remains operational and has not been uninstalled.

The device control platform 12 also includes shared databases 32 and a database manager 34 arranged to manage data stored in the shared databases 32. In this example, the shared databases 32 include the following.

a users database 36 that stores information indicative of users of the device management system;
a devices database 38 that stores information indicative of user devices associated with the system, including information unique to the user devices such as MAC addresses, IP addresses and/or mobile service numbers;
an access point database 40 that stores information indicative of controlled access points 20 that are registered with the system 10 and associated with a respective administrator;
a services database 42 that stores information indicative of services available to a user device that accesses the device control platform 12;
a contacts database 44 arranged to store information indicative of contacts for each user device, for example so that usage policies can be created that are dependent on the contacts, such as for the purpose of preventing or restricting texts, phone calls or email; and
a customers database 46 that stores information indicative of each administrator of the system who manages accessibility by user devices associated with the administrator.

The shared databases 32 also includes a calendar database 48 arranged to store information indicative of a calendar customisable by at least a primary administrator of the device 18 or 22, including a current day type, such as but not limited to a weekend, weekday, school day or public holiday. The calendar database 48 also stores information indicative of the user device 18 or 22 and/or administrator associated with each calendar. For example, upon request, the database manager 34 can retrieve information from the calendar database 48 indicating that a current day type is a 'school day', according to the calendar associated with the user device 18 or 20.

The shared databases 32 also includes a device schedule database 50 arranged to store information indicative of the specified time periods defined for each user device associated with the system 10, and information indicative of the administrator associated with each specified time period. In this example, the specified time periods are time periods within a 24-hour day, and are dependent on a day type. For example, FIG. 2 illustrates five distinct time periods that may be applied to the user device 18 on a 'school day'. In this example, the 'school day' comprises:

'Time Period 1' corresponding to a period of time at school;
'Time Period 2' corresponding to play time;
'Time Period 3' corresponding to dinner time;
'Time Period 4' corresponding to study time;
'Time Period 5' corresponding to sleep time.

Different day types may have different specified time periods. For example, a 'weekend' day type may not have a time period corresponding to a period of time at school. Using the current day type information retrieved from the calendar database 48, the database manager 34 can retrieve information from the device schedule database 50 indicative of the specified time period applicable when a usage request is made. Since the device schedule database 50 also stores information indicative of the administrator associated with each time period, the policy set selected by the relevant administrator for each time period is also identifiable.

Operation of the System

Figure 3:
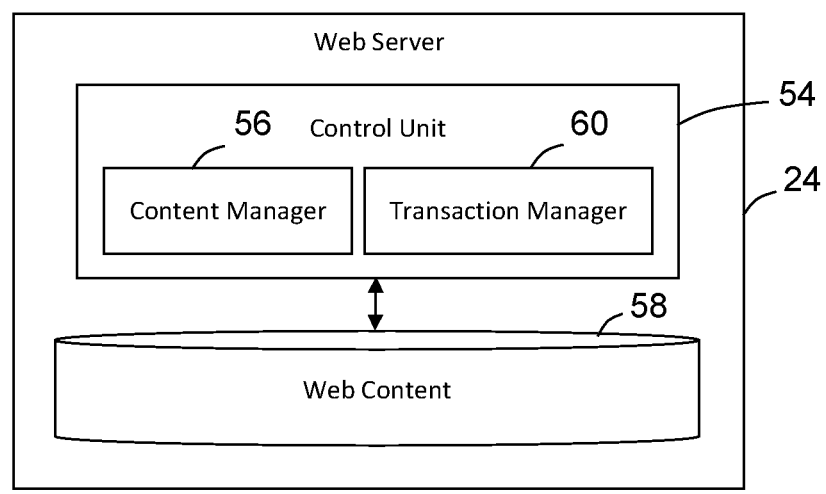
FIG. 3 is a block diagram of a web server of the device management system shown in FIG. 1.

Referring to FIG. 3, the web server 24 includes a web content database 58 arranged to store content that forms the basis of a website served to an administrator by the web server 24, and a control unit 54 arranged to control and coordinate operations in the web server 24. In this example, the control unit 54 implements a content manager 56 arranged to manage display of web content from the web content database 58 on a web page served to the administrator. The web content database 58 includes different content to be served to primary and secondary administrators of a user device, for example, to reflect the different specified time periods for selection or customisation to respective administrators, which is managed by the content manager 56.

The control unit 54 also implements a transaction manager 60 arranged to manage actions that an administrator is able to carry out using the website, including creation or modification of accounts, selection or modification of usage policies, and registration of new devices. In order to carry out actions, the administrator accesses the configuration web page, identifies him/herself, and is granted access to the website based on positive identification, for example through login and password authentication.

Figure 4:
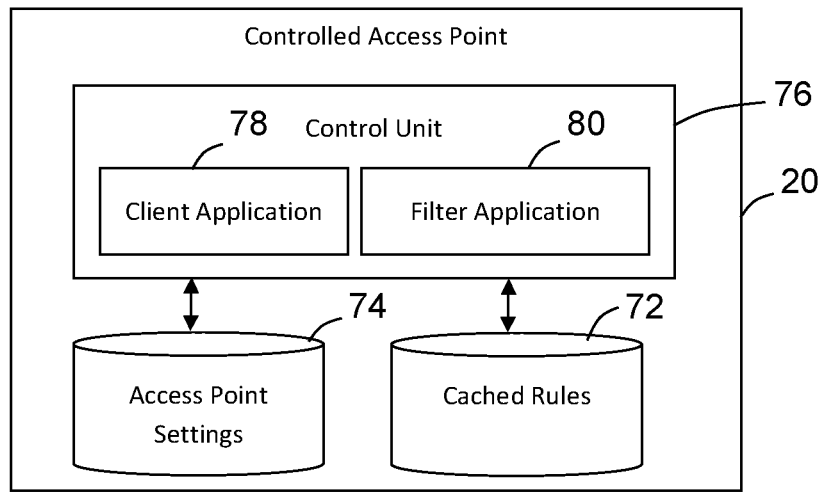
FIG. 4 is a block diagram of a policy server of the device management system shown in FIG. 1.

Referring to FIG. 4, the controlled access point 20 is an access point that facilitates access to the wide area network 16 (typically the Internet) wirelessly. The access point 20 is also equipped with components that enable the access point 20 to apply access restrictions to connected user devices according to defined usage policies 65 stored in the policy server 28. In this example, the controlled access point 20 includes cached rules 72 corresponding to usage restrictions previously enforced for user devices that have already connected to the controlled access point 20, in order to efficiently enforce previously applied access policies. The controlled access point 20 also stores access point settings 74 that define conventional settings for a wireless access point, such as WiFi security settings. A control unit 76 controls and coordinates operations in the controlled access point 20, and implements a client application 78 arranged to communicate with the access point control server 26 to manage configuration and firmware updates of the controlled access point 20, and to record usage statistics.

The controlled access point 20 also includes a filter application 80 that identifies user devices that wirelessly connect to the controlled access point 20 using a unique identifier associated with the user device, such as but not limited to a MAC address, a SIM number or an IMEI number. The filter application 72 also monitors data passing between the user device and the controlled access point 20, enforces restrictions defined in the cached rules 72 or communicated to the controlled access point 20 by the policy server 28.

Figure 5:
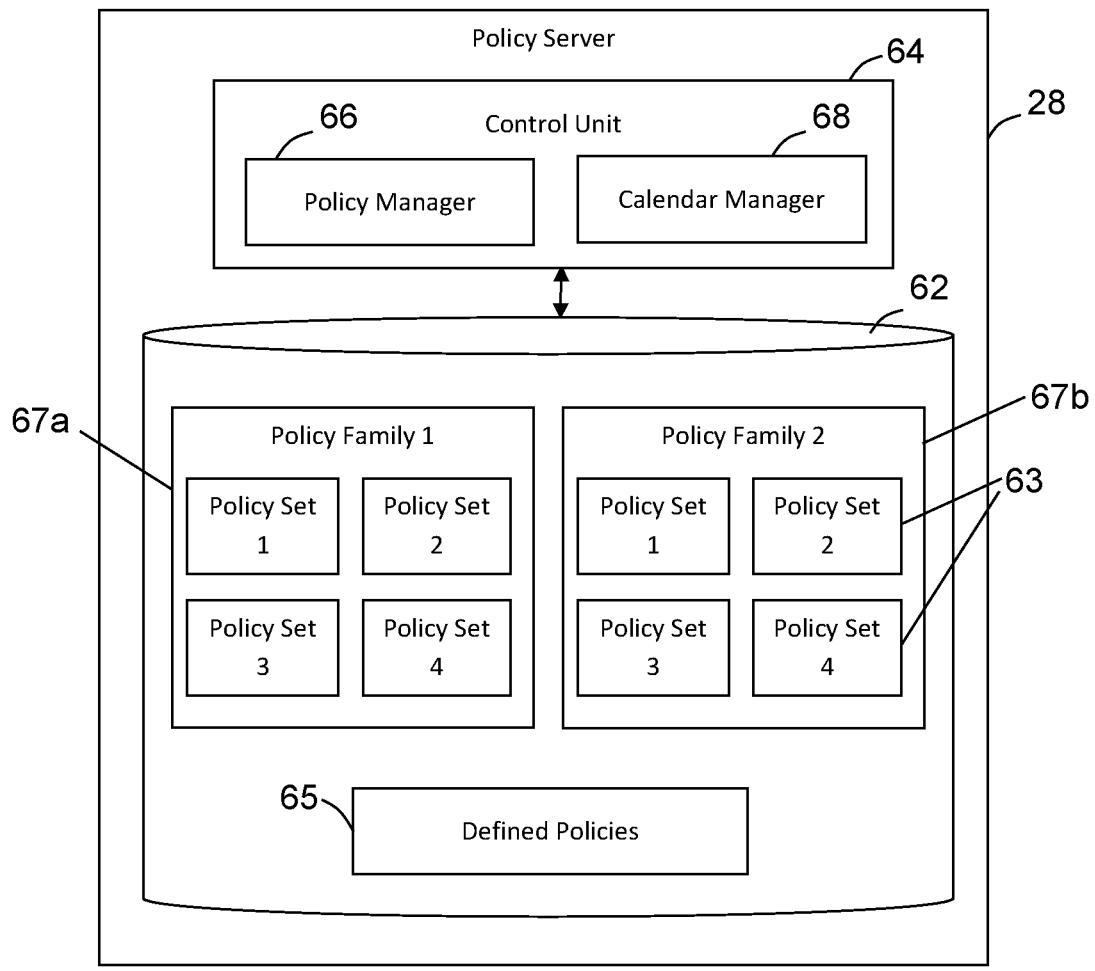
FIG. 5 is a block diagram of a controlled access point of the device management system shown in FIG. 1.

Referring to FIG. 5, the policy server 28 includes a policies database 62 that stores information indicative of predefined policy sets 63 to be selected by administrators. The policies database 62 also stores policy sets that have been defined for each user device by the relevant administrator, as defined policy sets 65.

Each policy set 63 defines different usage rules, or different levels of usage rights. For example, a policy set may be specific to a particular age group, maturity level or school year or define a high, low or medium level of access restriction. In this example, the predefined policy sets 63 may be grouped in the policies database 62 in usage policy families according to usage permission and/or usage restriction characteristics. In particular, the system 10 in this example stores default policy families in the policies database 62, which include pre-selected usage policy sets for each family 67 that align with the particular needs or values of a particular user group, such as a religious group or a school community.

The database 62 stores a plurality of policy families, such as 'Policy Family 1' (67a) and 'Policy Family 2' (67b) shown in FIG. 4, that can be selected by various administrators depending on the particular need. For example, 'Policy Family 1' may include default policy sets suitable for a plurality of devices used by members of an immediate family and managed by the same administrator, such as:
  Policy Set 1: child policy set.
  Policy Set 2: young adult policy set.
  Policy Set 3: adult policy set.
  Continuing with the example, 'Policy Family 2' may include default policy sets suitable for a plurality of devices used by students of a school, such as:
  Policy Set 1: pre-school policy set.
  Policy Set 2: primary school policy set.
  Policy Set 3: middle school policy set.
  Policy Set 4: senior school policy set.

Once a policy family 67 is selected, the system 10 is arranged to allow the relevant administrator to modify the policy family, for example, by selecting different policies or modifying usage policies within the policy sets.

When the device 18 or 22 is managed by both a primary and secondary administrator, the primary administrator may for example select 'Policy Family 1' to apply to the device during at least one first predefined time period, while a secondary administrator may select 'Policy Family 2' to apply during at least one second predefined time period.

Figure 9:
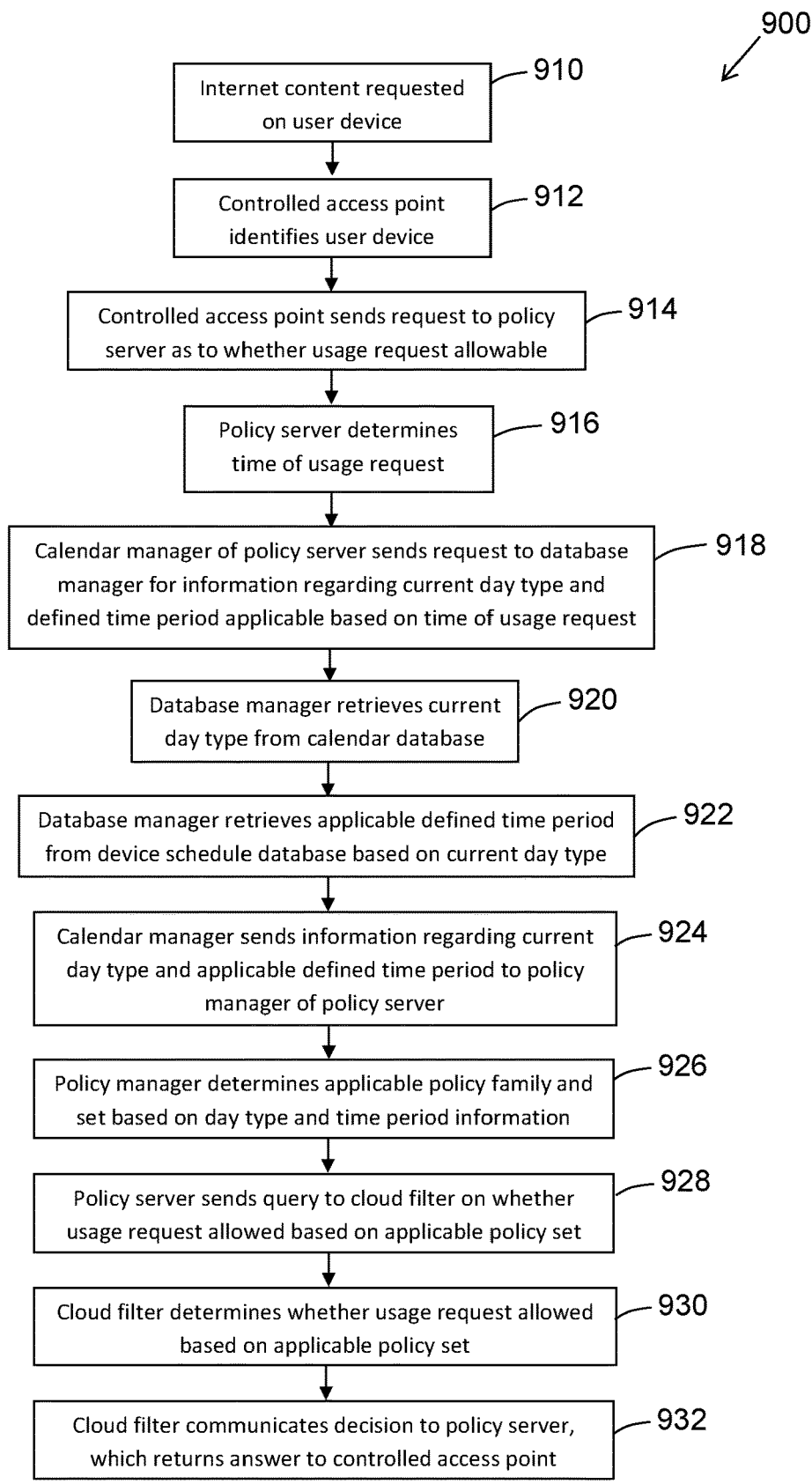
FIG. 9 is a flow diagram illustrating operation of the device management system when a usage request is made.

The policy server 28 also includes a control unit 64 arranged to control and coordinate operations in the policy server 28. The control unit 64 may include a microprocessor and associated memory and any other component as required to implement the functionality of the policy server 28. In this example, the control unit 64 implements a policy manager 66 arranged to interface with the policies database 62. The control unit 64 also implements a calendar manager 68 arranged to communicate with the database manager 34 to retrieve information regarding predefined time periods associated with each administrator of the device. The control unit 64 is also arranged to add new usage policies and implement changes to usage policies in response to an administrator request An example of a process 900 performed by the system 10 when a usage request is made will now be described with additional reference to FIG. 9. In this example, a non-controlled user device 18 is connectable to the wide area network 16 via either the controlled access point 20a (e.g. at home) or the controlled access point 20b (e.g. at school).

When Internet content is requested 910 on the user device 18, the access point 20a or 20b identifies 912 the user device 18 based on identifier information unique to the user device 18, such as but not limited to a MAC address. The access point 20 then sends 914 the usage request and unique identifier information of the user device 18 to the policy server 28 in order to determine whether the usage request is allowable at the time the request was made.

The policy server 28 then determines 916 current timing information, which will substantially correspond to the actual time at which the usage request was made on the user device 18. In particular, the policy manager 66 of the control unit 64 of the policy server 28 obtains current timing information from a clock unit 70 in communication with the policy server 28. The clock unit 70 returns information indicative of a current time of day and date. For example, the policy manager 66 may obtain timing information indicating that the usage request from the user device 18 was made at around 10.21 am on Friday, 22 Sep. 2017. The policy manager 66 then informs the calendar manager 68 of the timing information and the unique identifier information of the requesting user device 18.

The calendar manager 68 then sends 918 a request to the database manager 34 of the device management platform 12 for information regarding the current day type and predefined time period applicable based on the timing information and unique identifier information of the user device. The database manager 34 retrieves 920 the current day type from the calendar information stored for the user device 18 in the calendar database 48. The database manager 34 then retrieves 922 the predefined time period for the user device 18 from the device schedule database 50 based on the retrieved current day type. The current day type based on the timing information may for example be a 'school day', and the predefined time period may for example be 'Time Period 1' associated with a secondary administrator in the example shown in FIG. 2. The database manager 34 then returns information regarding the retrieved day type and predefined time period to the calendar manager 68, which then sends 924 the information to the policy manager 66.

The policy manager 66 determines 926 the applicable policy family and policy set based on the retrieved day type and predefined time period information by interfacing with the policies database 62. Continuing with the example above, the policy manager 66 associates 'Time Period 1' and 'school day' with a secondary administrator of the user device 18, and accordingly determines that 'Policy Family 2' (67b) applies. The policy manager 66 also determines the policy set in the policy family applicable to the user device 18. For example, if the user of the device 18 is a primary school child, the policy manager 66 determines that 'Policy Set 2' applies.

The policy server 28 then sends 928 information indicative of the identified policy set to the cloud filter 14 in order to determine whether the usage request 910 is allowed based on the applicable policy set. The cloud filter 14 makes a determination 930 as to whether the usage request is allowed according to the identified policy set and access rules stored by the cloud filter 14. The cloud filter 14 then communicates 932 the decision to the policy server 28, which communicates with the controlled access point 20 to enforce the decision on the user device 18. For example, if the Internet content requested on the user device 18 provides access to a social network website, but the policy set applicable at 'Time Period 1' on a 'school day' when the request was made does not allow access to social network websites, access will be denied.

It will be appreciated that because the system 10 associates administrators with respective predefined time periods, which are stored remotely of user devices and access points 20, a user device 18 may be subjected to a policy set applied by an administrator that is not associated with the access point 20 presently connected to the user device 18. For example, if the user of the device 18 is at home on a 'school day', the device 18 may be connected to the controlled access point 20a associated with the primary administrator, but the applicable policy at the time a usage request is made can be determined by the secondary administrator, such as a school.

However, the system 10 also allows the primary administrator to modify the calendar associated with the user device 18, such as changing the current day type, which will be described below.

A process for managing usage of a controlled user device 22 is similar to the process 900 above, except that instead of an access point 20, the device management platform 12 communicates with client software installed on the device 22.

Figure 6:
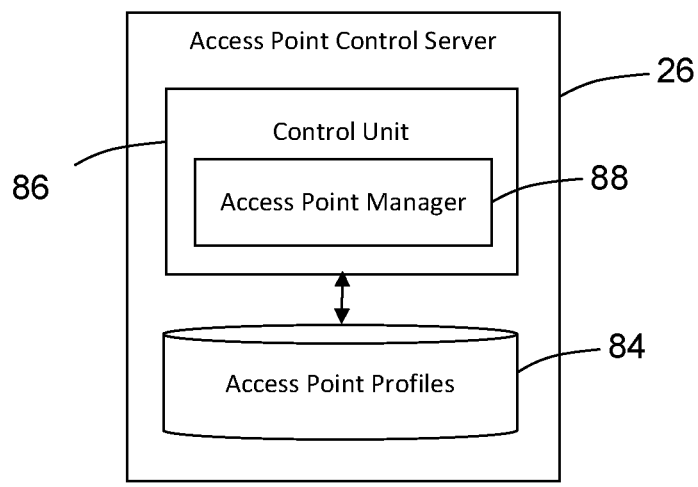
FIG. 6 is a block diagram of an access point control server of the device management system shown in FIG. 1.

Referring to FIG. 6, the access point control server 26 includes stored access point profiles 84 that define settings for each controlled access point 20 associated with the system. A control unit 86 controls and coordinates operations at the access point control server 26, and implements an access point manager 88 arranged to manage communication with controlled access points 20, such as managing updates at the controlled access points 20.

Figure 7:
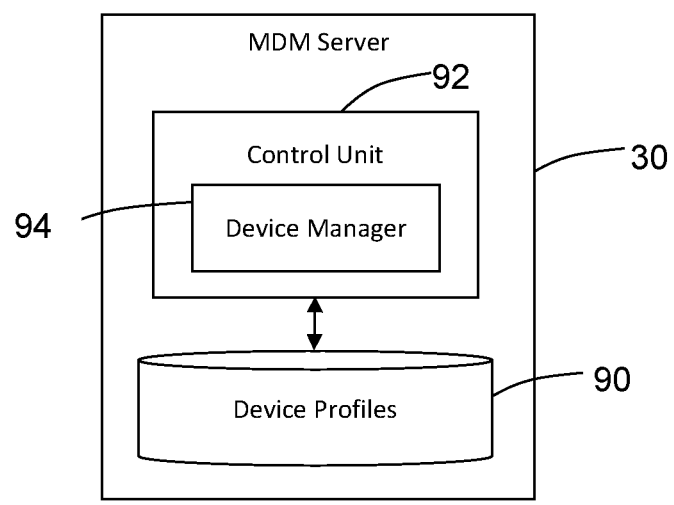
FIG. 7 is a block diagram of a MDM server of the device management system shown in FIG. 1.

Referring to FIG. 7, the MDM server 30 includes stored device profiles 90 including default device profile settings and actual device profile settings for each mobile user device associated with the system, and a control unit 92 that implements a device manager 94 arranged to coordinate communication with the mobile user devices, in particular in relation to managing updates at the mobile user devices.

Figure 8:
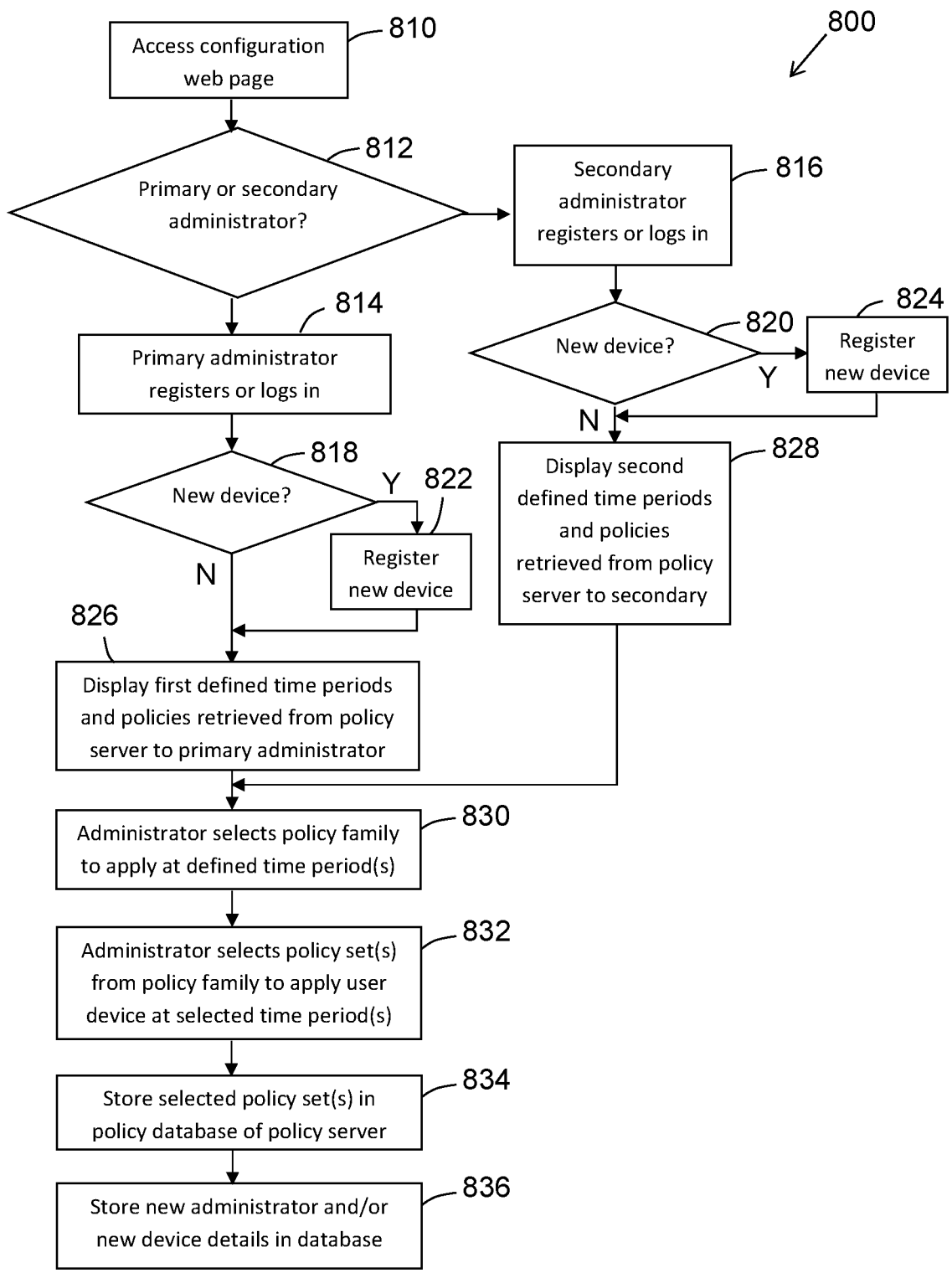
FIG. 8 is a flow diagram illustrating a controlled user device setup process of a method of managing a network enabled device in accordance with an embodiment of the present invention.

In order to configure the levels of usage permitted by a user device, a primary or secondary administrator at least partially responsible for the user of the user device follows a user policy setup process 800, as shown in FIG. 8.

The user policy setup process 800 is instigated when the primary or secondary administrator accesses 810 a configuration web page, in this example, served to a web browser on the administrator terminal 52 by the web server 40.

If the administrator is a new administrator, the administrator is directed to a web page that allows the administrator to register with the system 10. Otherwise, the administrator logs in through a login web page. Administrators can register as a primary administrator or a secondary administrator, or if the administrator has already registered with the system 10, at 812, the system will recognise them as a primary or secondary administrator after login 814, 816.

If a new device is to be registered, the administrator is directed to a web page that allows the administrator to register the new device 818, 822, 820, 824. If a newly registered administrator wishes to be associated with a user device that is already managed by the system, the administrator is directed to a webpage where a unique identifier of the user device can be entered so that the system 10 can associate the administrator with the device 18.

The system 10 retrieves from the policy server 28 at least one predefined time period available to the primary administrator for the user device, and displays 826 them to the primary administrator. The primary administrator is then presented with predefined policies that are selectable and customisable by the primary administrator to apply to the predefined time periods allocated to the primary administrator. This may occur by selecting 830, 832 policy families 67 and policy sets 63 for particular users and associating the selected policy families and policy sets with respective user devices associated with the users. Similarly, secondary administrators are presented 828 with at least one predefined time period available to the secondary administrator, and predefined policies that are selectable and customisable by the secondary administrator to apply to those time periods.

After the primary or secondary administrator selects the policy family 67 and policy sets 63 for the user device, the selected policy family 67 and policy sets 63 are stored 834 as defined policies 65 in the policy database 62 of the policy server 28. The selected policies are also stored at the cloud filter 12. The selected policy set(s) 82 may also be customised by the administrator as required.

If the administrator is new, the administrator details entered during registration are stored 836 in the customers database 46 and, similarly, if a new user device has been registered, details of the new user device are stored in the devices database 38.

The system 10 also allows the primary administrator to modify a calendar associated with the user device. In this regard, the web server 24 may present a web page to the primary administrator providing options for defining and/or modifying the day types stored in the calendar database 48 that are associated with the user device. The transaction manager 60 of the web server 24 may then communicate with the database manager 34 to implement the modification in the calendar database 48. In this manner, if for example the user of the device is a child at home on a 'school day', the primary administrator can modify the day type to a 'weekend' if desired, effectively overriding any policy sets selected by the secondary administrator for a school day.

The system 10 also allows the primary administrator to modify the default predefined time periods available to the primary and secondary administrator. In this regard, the web server 24 may present a web page to the primary administrator providing options for modifying the predefined time periods stored in the device schedule database 48 that are associated with the user device. The transaction manager 60 of the web server 24 may then communicate with the database manager 34 to implement the modification in the device schedule database 48. In this manner, if for example the default predefined time periods initially presented to the primary and secondary administrators do not accurately reflect the user's actual schedule, the primary administrator can rectify the predefined time periods.

It will be understood to persons skilled in the art of the invention that many modifications may be made without departing from the spirit and scope of the invention.

For example, a system according to another embodiment may be arranged such that a secondary administrator seeking to register with the system and be associated with a user device must be granted permission from a primary administrator associated with the user device before the secondary administrator can be associated with the device.

Additionally, it will be understood that the system may allow for more than two authorised users to be associated with a particular user device, i.e. a third, fourth, fifth authorised user etc., each authorised user being associated with one or more respective time period. This may occur for example if the user of the device is a child who has parents who live separately; the first authorised user may be one parent, the second authorised user may be another parent, and a third authorised user may be a school teacher.

In another example, the system may be arranged such that a user of the system, other than the authorised user associated with a particular time period, may request that the usage policies applicable during that time period be modified. In that case, the system may be arranged to alert the relevant authorised user of the request to modify the usage policies. The authorised user can then allow or deny the request. This may occur for example if the second authorised user (e.g. a school teacher) seeks to modify the usage policies applicable to a time period (e.g. 'study time' period) over which the first authorised user (e.g. a parent) has control.

In another example, instead of the policy server 66 identifying the policy set applicable during a specified time period based on the administrator responsible for that period, the policy server 66 may store a library of predefined time periods applicable to the device 18 and the policy set associated with each time period. Accordingly, once timing information has been retrieved by the calendar manager, the applicable policy set can be identified based on the timing information. Nevertheless, the policy sets applicable to each time period are still selected by a respective first or second authorised user.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

What is claimed is:

1. A system for managing Internet usage of at least one network enabled user device, the system comprising:
   a policy storage device separately located relative to the user device, the policy storage device arranged to store information indicative of a plurality of usage policy sets applicable to the user device, each usage policy set comprising a plurality of usage policies defining Internet usage permissions and/or Internet usage restrictions applicable to the user device; and
   one or more hardware processors arranged to:
      associate a first authorised user with at least one first time period, and to associate a second authorised user with at least one second time period different to the at least one first time period, wherein each time period is exclusive of any other time period, and wherein the first and second authorised users are different than a user of the user device;
      allow the first authorised user to select and/or modify a first policy set to be applied to the user device during the at least one first time period, and to allow the second authorised user to select and/or modify a second policy set to be applied to the user device during the at least one second time period, the one or more hardware processors being arranged such that the first authorised user cannot select and/or modify any policy set applicable during the at least one second time period and the second authorised user cannot select and/or modify any policy set applicable during the at least one first time period; and
      allow or deny a usage request from the user device based on the usage policy set to be applied when the usage request is made;
      wherein the usage policies applicable to the user device are dependent on a day type defined for a day when the usage request was made; and
      wherein for any particular day, said one or more hardware processors further allow the first authorised user to modify the day type to a different day type such that different usage policies are applicable to the user device.

2. The system of claim 1, wherein said one or more hardware processors further allow each authorised user to modify a respective policy set by modifying and/or defining at least one usage policy of the respective usage policy set.

3. The system of claim 1, wherein each time period corresponds to at least one day and/or a portion of the one day.

4. The system of claim 1, wherein the day type is a week day, a weekend day, a personal holiday day, a public holiday day, or a school day.

5. The system of claim 1, wherein said one or more hardware processors further allow the first authorised user to modify the at least one first time period.

6. The system of claim 1, wherein said one or more hardware processors further allow the first authorised user to modify the at least one second time period.

7. The system of claim 1, wherein said one or more hardware processors further allow the second authorised user to select and/or modify the second policy set if permission is granted by the first authorised user.

8. The system of claim 1, wherein said one or more hardware processors further store user device identification information for each user device managed by the system, the user device identification information being indicative of and unique to the user device managed by the system and being stored separate relative to the user device.

9. The system of claim 8, wherein the user device identification information indicative of and unique to the user device managed by the system includes a MAC address, a SIM card number, an IMEI number or a mobile telephone number of the user device.

10. A method of managing Internet usage of at least one network enabled user device, the method comprising:

storing, by a policy storage device located separately from the user device, information indicative of a plurality of usage policy sets applicable to the user device, each policy set comprising a plurality of usage policies defining Internet usage permissions and/or Internet usage restrictions applicable to the user device;

associating, by one or more hardware processors, a first authorised user with at least one first time period;

associating, by the one or more hardware processors, a second authorised user with at least one second time period different to the at least one first time period, wherein the first and second authorised users are different than a user of the user device;

allowing, by the one or more hardware processors, the first authorised user to select and/or modify a first policy set to be applied to the user device during the at least one first time period;

allowing, by the one or more hardware processors the second authorised user to select and/or modify a second policy set to be applied to the user device during the at least one second time period; and allowing or denying, by the one or more hardware processors, a usage request from the user device based on the usage policy set to be applied when the usage request is made;

wherein each time period is exclusive of any other time period and wherein the first authorised user cannot select and/or modify any policy set applicable during the at least one second time period, and the second authorised user cannot select and/or modify any policy set applicable during the at least one first time period;

wherein the usage policies applicable to the user device are dependent on a day type defined for a day when the usage request was made; and wherein, for any particular day, the first authorised user is allowed to modify the day type to a different day type such that different usage policies are applicable to the user device.

11. The method of claim 10, comprising allowing, by the one or more hardware processors, each authorised user to modify a respective policy set by modifying and/or defining at least one usage policy of the respective usage policy set.

12. The method of claim 10, wherein each time period corresponds to at least one day and/or a portion of the one day.

13. The method of claim 10, wherein the day type is a week day, a weekend day, a personal holiday day, a public holiday day, or a school day.

14. The method of claim 10, comprising allowing, by the one or more hardware processors, the first authorised user to modify the at least one first time period.

15. The method of claim 10, comprising allowing, by the one or more hardware processors, the first authorised user to modify the at least one second time period.

16. The method of claim 10, comprising allowing, by the one or more hardware processors, the second authorised user to select and/or modify the second policy set if permission is granted by the first authorised user.

* * * * *